United States Patent [19]

Ettelt et al.

[11] 4,089,784

[45] May 16, 1978

[54] BELT TYPE OIL REMOVAL UNIT

[75] Inventors: Gregory A. Ettelt, Berwyn; Alfred L. Cohen, Deerfield, both of Ill.

[73] Assignee: Tenco Hydro/Aerosciences, Inc., Countryside, Ill.

[21] Appl. No.: 671,383

[22] Filed: Mar. 29, 1976

[51] Int. Cl.² ............................................. B01D 17/00
[52] U.S. Cl. ..................... 210/526; 198/648; 198/835; 210/DIG. 4; 210/DIG. 25
[58] Field of Search ............... 210/160, 242 S, 324, 210/359, 400, 401, 526, DIG. 26, DIG. 25, 153, 171, DIG. 4; 254/190 R, 191; 198/643, 835

[56] References Cited

U.S. PATENT DOCUMENTS

| | | | |
|---|---|---|---|
| 1,511,506 | 10/1924 | Cortes | 198/643 |
| 1,989,537 | 1/1935 | Wentz | 198/835 |
| 2,802,366 | 8/1957 | Borner | 254/191 |
| 2,804,020 | 8/1957 | Lorig et al. | 198/643 |
| 3,426,902 | 2/1969 | Kilpert et al. | 210/DIG. 26 P |
| 3,487,927 | 1/1970 | Yahnke | 210/DIG. 26 P |
| 3,508,663 | 4/1970 | Brill | 210/DIG. 26 P |
| 3,617,552 | 11/1971 | Will et al. | 210/DIG. 26 P |
| 3,640,394 | 2/1972 | Brill et al. | 210/DIG. 26 P |
| 3,668,118 | 6/1972 | Rhodes | 210/DIG. 26 P |
| 3,709,369 | 1/1973 | Brill et al. | 210/DIG. 26 P |
| 3,764,016 | 10/1973 | Sewell et al. | 210/DIG. 26 P |
| 3,907,685 | 9/1975 | Aramaki et al. | 210/242 S |

*Primary Examiner*—Frank Sever
*Attorney, Agent, or Firm*—George H. Gerstman

[57] ABSTRACT

A system is provided for removing accumulated oil from a basin. An endless belt for carrying oil is partially submerged in the basin and is driven and supported by a rotary drum. The rotary drum has an irregular surface for frictional cooperation with the belt and a spring-biased roller urges the belt against the irregular surface. The oil is scraped from the belt and directed away from the belt and basin. Means are also provided for wiping the underside of the drum surface.

2 Claims, 3 Drawing Figures

BELT TYPE OIL REMOVAL UNIT

BACKGROUND OF THE INVENTION

This invention relates to an improved system for removing accumulated oil from a basin, and more particularly, to a belt skimmer type oil removal unit.

A belt skimmer basically comprises an endless belt loop which is continuously revolved by a rotary drum, with the bottom loop of the belt submerged in the basin containing the oil to be removed. The oil adheres to the belt and is carried up by the belt into the unit and around the drum. The belt then passes between blades which scrape the oil off the belt.

When the belt is coated with oil, it becomes very slippery and tends to slip on the rotating element. The belt does not maintain its travel velocity relative to the rotating element, and often the belt stops. This results in at least erratic operation and inefficient oil removal. Another problem results from the oil running back down the belt into the basin, because the belt is operating too slowly.

In order to maintain the proper, constant velocity of the belt, one prior art type system uses a weighted or tension device on the bottom loop that is submerged in the water. However, this can cause jamming of the belt below the water due to improper alignment or loss of the separate device because of foreign debris. It can also cause difficult installation problems in many cases.

Another prior art system passes the belt between a roller arrangement and the rotating element to squeeze the belt in between the two. The disadvantage of this expedient is that it tends to squeeze the oil back down the belt into the basin before it gets to the scrapers.

It is, therefore, an object of the present invention to provide a system for maintaining a proper and constant velocity of the belt during the belt skimming operation.

Another object of the present invention is to properly remove the oil from the moving belt in a belt skimming operation.

Other objects and advantages of the present invention will become apparent as the description proceeds.

SUMMARY OF THE INVENTION

In accordance with the present invention, a system is provided for removing accumulated oil from a basin. The system comprises an endless belt for carrying oil, with the endless belt being adapted for partial submergence in the basin. A rotary drum is provided for supporting and driving the endless belt. The rotary drum has an irregular surface for frictional cooperation with the belt. Means are provided for urging the belt against the irregular surface. Means are provided for scraping oil from the belt and means are provided for directing the scraped oil away from the belt and basin.

In the illustrative embodiment, the irregular surface comprises expanded metal overlaid in a wavefront configuration, and the urging means comprises an idler roller in rolling engagement with the outside belt surface, and spring-biased lever means urging the idler roller against the outside belt surface.

In the illustrative embodiment, the oil scraping means comprises an oil wiper on the downstream side of the drum and the system further includes means for wiping the underside of the drum surface.

A more detailed explanation of the invention is provided in the following description and claims, and is illustrated in the accompanying drawings.

DETAILED DESCRIPTION OF THE ILLUSTRATIVE EMBODIMENT

Referring to the figures, a basin 10 is shown therein having liquid with accumulated oil to be removed therefrom. An endless belt 12 is provided for carrying the accumulated oil from the basin. Belt 12 is formed with polyester plys having a vinyl elastomer coating which attracts hydrophobic materials while withstanding acid/alkali attack. It also resists oil deformation from both petroleum and vegetable base compounds.

Figure 3:
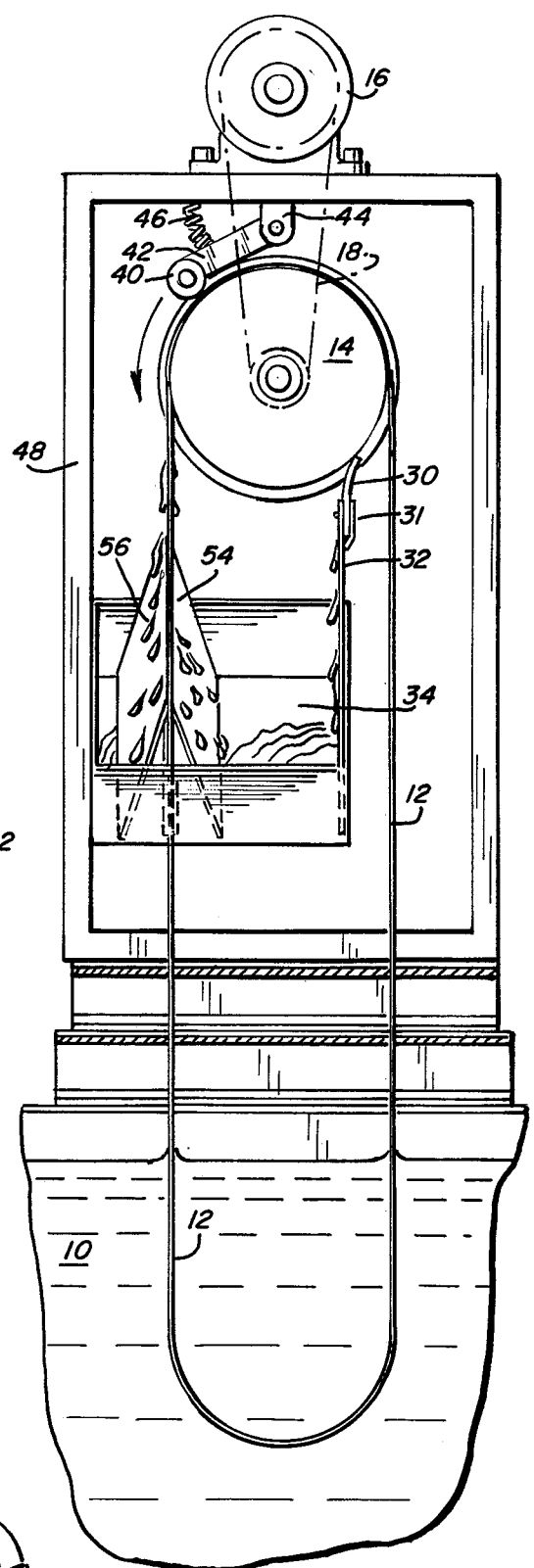
FIG. 3 is an elevational view, taken from the right side of FIG. 2, of a belt-type oil removal unit constructed in accordance with the principles of the present invention.

Belt 12 is supported and driven by a rotary drum 14. Rotary drum 14 is rotated by means of motor 16 and belt 18 which is driven in the counterclockwise direction (with respect to FIG. 3) to drive drum 14 in the counterclockwise direction (with respect to FIG. 3).

Figure 1:
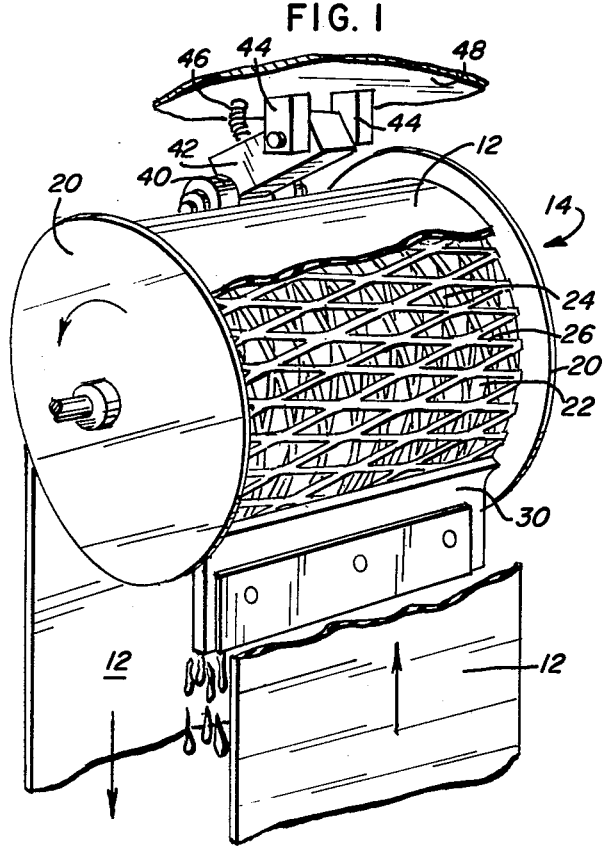
FIG. 1 is a fragmentary, perspective view of the drum portion of a belt-type oil removal unit constructed in accordance with the principles of the present invention.

Drum 14 is shown in most detail in FIG. 1. The drum comprises opposing ends 20 and an instrumental surface 22. The instrumental surface 22 is formed of an irregular surface, and in particular, in the illustrative embodiment instrumental surface 22 comprises a wavefront design consisting of expanded metal overlaid on the surface of the drum. Thus a lower formation of expanded metal 24, having a generally diamond-shaped mesh, is overlaid with an upper surface of expanded metal 26, having a generally diamond-shaped mesh, with expanded metal 24 and expanded metal 26 criss-crossing with respect to each other. This has been found to provide an excellent gripping surface and desirable characteristics for operating with a belt coated with oil.

During operation of the system, some of the oil from the belt becomes applied to the rotating drum. To aid in overcoming this problem, a wiper 30, connected by suitable fastener means 31 to upright 32 is provided at the underside of the drum to wipe the underside of the rotating drum during rotation thereof. Wiper 30 is strategically positioned so that the oil wiped from the underside of drum 14 will fall into trough 34.

Figure 2:
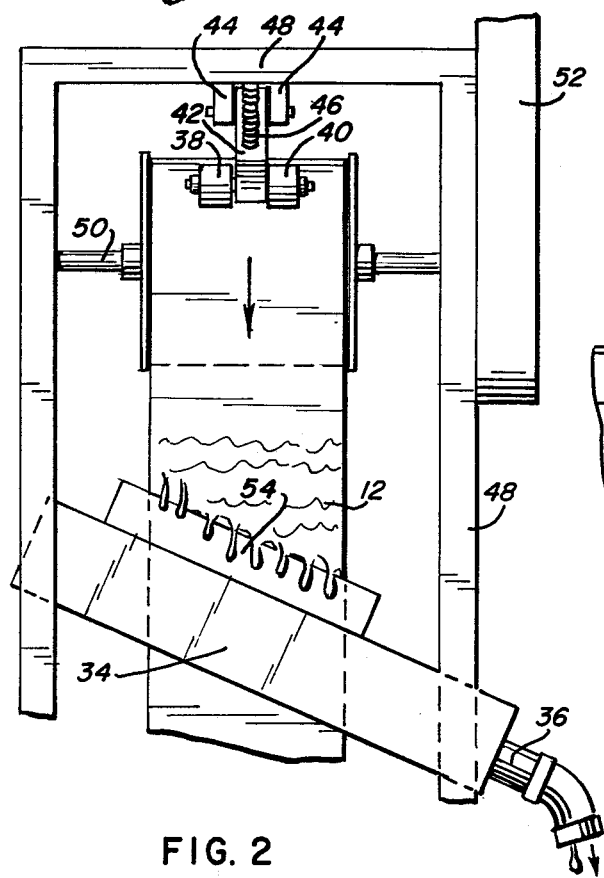
FIG. 2 is a fragmentary front view thereof.

Trough 34 is angled (see FIG. 2) with an outlet conduit 36 coupled to the lower end of trough 34. Thus oil directed into trough 34 will be directed outward therefrom via conduit 36 to a location remote from the belt and basin.

In order to aid in providing a constant velocity belt movement, a pair of idler rollers 38, 40, which are spring-biased to urge the belt against surface 22, are provided. Rollers 38, 49 are pivotally connected to the distal end of lever 42 which is pivotally connected to arm 44 and spring-biased in the downward direction by means of spring 46. Arms 44 are rigidly fastened to frame member 48 and the shaft 50 of drum 14 is journaled within frame 48 and one side of shaft 50 extends through the frame to a gear box located within meter housing 52.

On the downstream side of the drum, a pair of scrapers 54, 56 are provided for scraping the oil off the belt and permitting the oil to run down the scrapers and thereupon be directed into trough 34 for removal from the system via conduit 36.

In the operation of the system, the endless belt is supported by rotating drum 14 and is urged against the rotating drum by the idler rollers 38, 40. The lower portion of belt 12 extends into basin 10. During rotation of the belt, oil will adhere to the belt and be lifted upwardly and around the rotating drum, whereupon the oil will be wiped by scrapers 54 and 56, will run down the scrapers and be directed into trough 34 for removal via conduit 36. Wiper 30 will operate to wipe the underside of the drum during rotation. As a result of the irregular surface configuration of the drum and the force of the idler rollers against the belt, the system will maintain the belt in a relatively constant velocity, thereby providing an effective and efficient oil removal system.

Although an illustrative embodiment of the invention has been shown and described, it is to be understood that various modifications and substitutions may be made by those skilled in the art without departing from the novel spirit and scope of the present invention.

What we claim is:

1. A system for removing accumulated oil from a basin, which comprises: an endless belt for carrying oil, said endless belt being adapted for partial submergence in the basin; a rotary drum for supporting and driving said endless belt, said rotary drum having a rough, irregular surface formed from expanded metal overlaid in a wavefront configuration for frictional cooperation with a flat surface of said belt; an idler roller in rolling engagement with the outside surface of said belt for urging said belt against said irregular surface; an oil wiper on the downstream side of the drum for scraping oil from said belt; an angled trough and conduit connected to the outlet thereof for directing the scraped oil away from the belt and basin; and means for wiping the underside of the drum surface.

2. A system for removing accumulated oil from a basin, which comprises: an endless belt for carrying oil, said endless belt being adapted for partial submergence in the basin; a rotary drum for supporting and driving said endless belt, said rotary drum having a rough, irregular surface comprising expanded metal overlaid in a wavefront configuration for frictional cooperation with a flat surface of said belt, whereby the frictional cooperation between the drum and belt provides superior gripping and alleviates the need for submerged belt supports; means for urging said belt against said rough, irregular surface; means for scraping oil from said belt; and means for directing the scraped oil away from said belt and basin.

* * * * *